United States Patent
Johannesson et al.

(10) Patent No.: US 6,843,203 B2
(45) Date of Patent: Jan. 18, 2005

(54) DEVICE FOR AT LEAST ONE MILKING STALL AND A PARLOR COMPRISING A PLURALITY OF MILKING STALLS

(75) Inventors: Leif Börje Johannesson, Tullinge (SE); Helmut Peter Paul Obermüller, Vällingby (SE)

(73) Assignee: DeLaval Holding AB, Tumba (SE)

( * ) Notice: Subject to any disclaimer, the term of this patent is extended or adjusted under 35 U.S.C. 154(b) by 51 days.

(21) Appl. No.: 10/239,097

(22) PCT Filed: Mar. 16, 2001

(86) PCT No.: PCT/SE01/00551

§ 371 (c)(1), (2), (4) Date: Sep. 17, 2002

(87) PCT Pub. No.: WO01/67852

PCT Pub. Date: Sep. 20, 2001

(65) Prior Publication Data

US 2003/0019433 A1 Jan. 30, 2003

(30) Foreign Application Priority Data

Mar. 17, 2000 (SE) .............................................. 0000893

(51) Int. Cl.⁷ ................................................. A01K 1/12
(52) U.S. Cl. ................................. 119/14.03; 119/14.18; 119/520
(58) Field of Search ........................... 119/14.03, 14.18, 119/14.1, 516, 520, 523

(56) References Cited

U.S. PATENT DOCUMENTS

| | | | | |
|---|---|---|---|---|
| 502,829 A | * | 8/1893 | Phillips | 119/520 |
| 2,696,801 A | * | 12/1954 | Hill | 119/14.03 |
| 2,904,005 A | * | 9/1959 | Mielke et al. | 119/520 |
| 3,805,742 A | * | 4/1974 | Shulick et al. | 119/524 |
| 4,401,055 A | * | 8/1983 | Street et al. | 119/14.03 |

* cited by examiner

Primary Examiner—Yvonne R. Abbott
(74) Attorney, Agent, or Firm—Hovey Williams LLP

(57) ABSTRACT

The invention refers to a device for at least one milking stall (3) with a milking position (4) for an animal and with at least one milking equipment including a milking member arranged to be attached to including animal for milking thereof. The milking stall (3) is defined by at least one wall arrangement (5) and a floor (6) and extends between a first end (7) and a second (8) end in such a way that when an animal is present in including milking stall (3) in including milking position, the front portion of including animal is adjacent including first end (7) and the back portion of including animal is adjacent including second end (8). The device includes a cabinet-like structure (1), which has a longitudinal axis extending in a substantially vertical direction and which defines an inner space and which forms a building element of including milking stall (3). The invention also refers to a parlour (2) including a plurality of milking stalls (3) and the cabinet-like structure (1) forms a building element of including parlour (2).

33 Claims, 6 Drawing Sheets

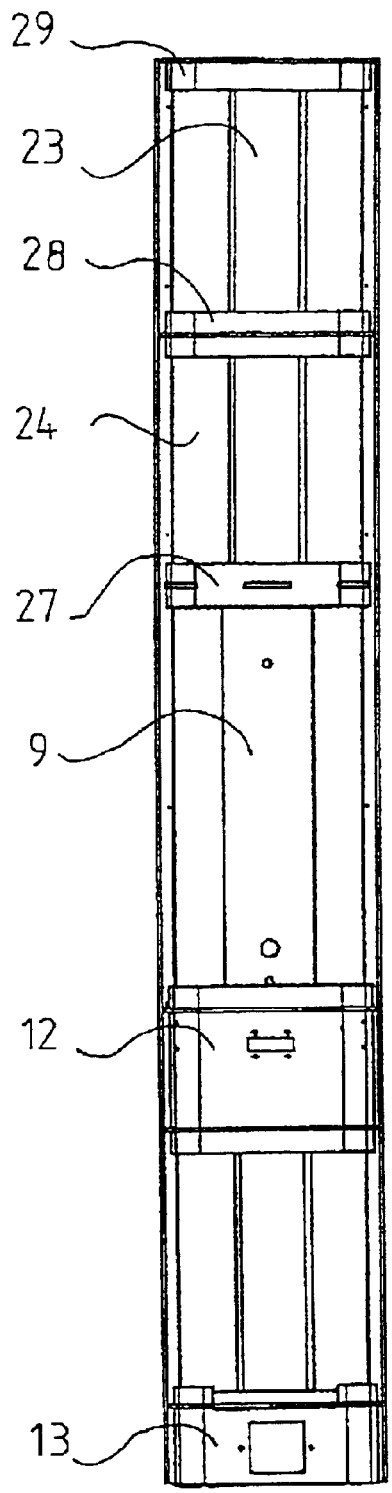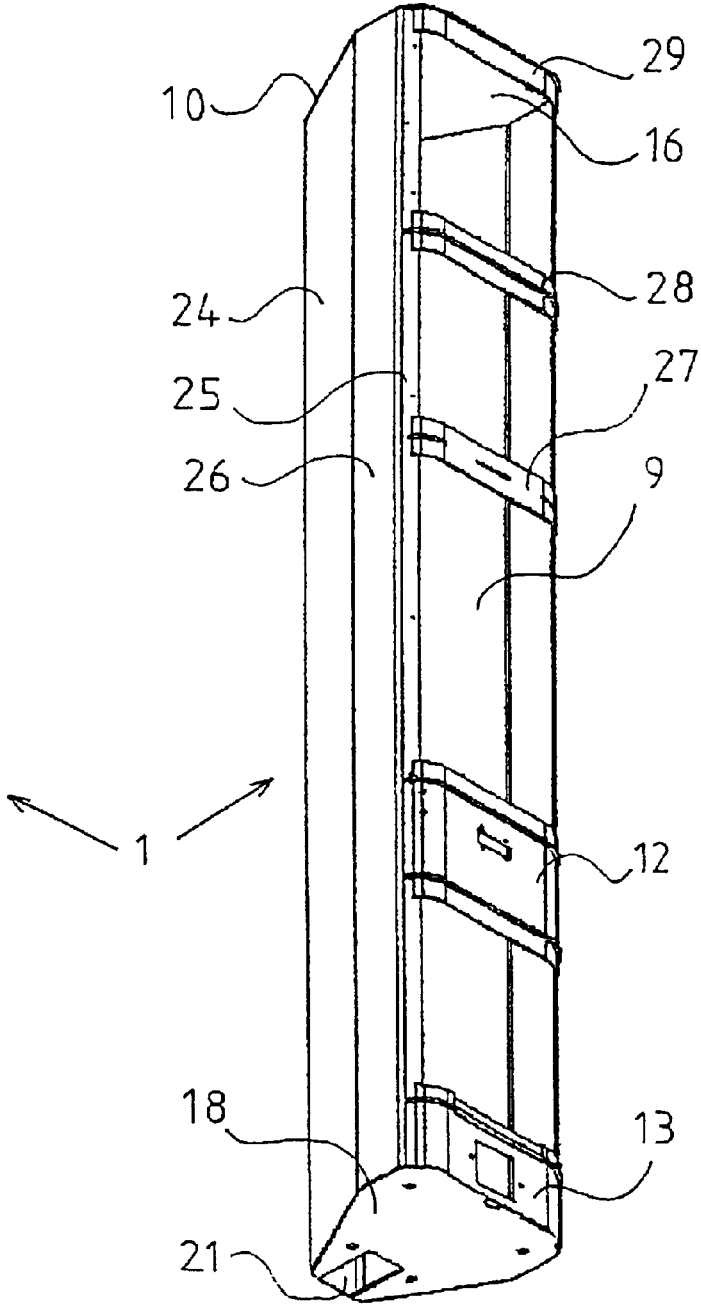
FIG 4a
FIG 4b

DETAIL A

DEVICE FOR AT LEAST ONE MILKING STALL AND A PARLOR COMPRISING A PLURALITY OF MILKING STALLS

TECHNICAL FIELD OF THE INVENTION AND PRIOR ART

The present invention relates to a device for at least one milking stall according to the precharacterising portions of claim 1 and claim 27. The invention also refers to a parlour comprising a plurality of milking stalls according to the precharacterising portion of claim 24.

In a conventional milking stall, there is a milking equipment with a lot of different components. These components comprise usually a milking member in the form of a number of teatcups which may be connected to a common claw, a long milk conduit connecting the claw to a milk-collecting member and to a vacuum source for transferring a milking vacuum to the teats, a holding member, or a so called service arm, for holding and supporting the long milk conduit, a pulsator arranged to provide a pulsating vacuum for a pulsating chamber in each teatcup, a remover for removing the milking member from the teats after the milking is finished, a control unit for controlling the vacuum level of the milking equipment and an operating panel for supervising and controlling of the milking procedure and the milking equipment. It is thereby known to provide these different components at different locations in the milking stall. Moreover, it is important to maintain good hygiene in the milking stall, especially it is important that the milking member is cleaned between each milking operation. Hereby, the milking stall may comprise a cleaning device for cleaning the milking member.

It is also known to provide at least some of the above-mentioned components in a cabinet in order to protect them and have them easily accessible at one single location. Such a cabinet is usually mounted in the milking stall so that it is easy to reach for the milker. The cabinet may be attached to a structural element of the milking stall, such as a bar or the like.

Today dairy farms have increased in size and use of high technology, wherein the demands for more efficient milking parlours have increased. Today milking parlours exist in different configurations and may have different capacity, i.e. may comprise different number of milking stalls. Each milking stall has a milking position for an animal. Moreover, the milking stalls of the milking parlours are usually narrow on the one hand in order to limit the movements of an animal during a milking operation and on the other hand in order to achieve as many milking stalls as possible in relation to the area available. This results in that the space available for different components of the milking equipment and other equipment such as cleaning equipment is limited. Moreover, the access to different components, such as for example the components of the milking equipment, is important to the milker. The access to different components is also important in case of service, maintenance and/or repair.

Moreover, to the producers of parlours, in order to be competitive on the market, it is important that the production costs of a parlour and/or an individual stall are kept at a low level, wherein it is an advantage to provide a parlour which has as few building elements as possible and that the building elements and parts of the building elements are easy to replace in case of service and/or repair or if some building elements or parts of the building elements are destroyed. Moreover, each building element of the milking stall has to be robust and withstand forces from an animal being present in a milking stall.

SUMMARY OF THE INVENTION

The object of the invention is to provide an improved cabinet-like structure, which also forms a part of the milking stall or a milking parlour. Hereby, the cabinet-like structure has to be robust and withstand forces from an animal being present in a milking stall. It is also desirable that most of the elements of the cabinet-like structure are of a modular construction so that they may be easily replaced if required and the production costs may be kept low.

This object is achieved by the device initially defined and characterised in that the cabinet-like structure forms a building element of said milking stall. Consequently, the cabinet-like structure defines an inner space where different components, such as components of the milking equipment, may be housed at the same time as it forms a building element of said milking stall, i.e. forms a part of said milking stall.

According to an embodiment of the invention, the building element carries said wall arrangement and is mounted to said floor. Consequently, the cabinet-like structure forms a supporting structural element for said wall arrangement and since the cabinet-like structure extends from the floor a lot of equipment may be housed in the inner space. In case of a rotary parlour comprising a plurality of milking stalls, said floors of the milking stalls form a platform which may rotate during a milking operation of the animals in relation to the floor onto which the milker is standing who for example may supervise and control the milking procedure.

According to a further embodiment of the invention, the cabinet-like structure comprises wall members of a material with thin wall thickness and the wall members extend in said substantially vertical direction and are attached to each other and form a hollow tube-like structure which surrounds said inner space. The wall members surrounding said inner space protect the different components, which are housed inside the cabinet-like structure. Moreover, since the wall members surround the inner space a cabinet-like structure is achieved which is easy to keep clean from the outside. The tube-like structure may have different shapes, in a cross sectional view seen along said longitudinal axis. However, the tube-like member is shaped so that it may resist forces from an animal being present in the milking stall.

According to a further embodiment of the invention, the cabinet-like structure comprises a top portion and a bottom portion and said bottom portion is attached to said floor. Consequently, the bottom portion may be directly attached to the floor of the milking stall.

According to a further embodiment of the invention, the cabinet-like structure comprises a substantially horizontal top plate which connects the wall members at the top portion, and a substantially horizontal bottom plate which connects the wall members at the bottom portion, wherein the cabinet-like structure forms an elongated hollow box-like structure which extends in said substantially vertical direction and which encloses said inner space. Owing to the top plate and the bottom plate a structure with good torsional rigidity is achieved. Moreover, since said top plate and said bottom plate together with said wall members enclose said inner space, the inner space is protected from dirt and dust from the outside environment. The bottom plate may be a part of said floor of the milking stall but the bottom plate may also be formed of a separate thin metal sheet, wherein the cabinet-like structure is attached to said floor via said thin metal sheet by screws or the like.

According to a further embodiment of the invention, the respective wall member is formed of a thin metal sheet, preferably corrosion-resisting steel, with a thickness about 2–4 mm. Also the top plate may be formed of a thin metal sheet, preferably corrosion-resisting steel, as well as the bottom plate, with a thickness about 2–mm.

According to a further embodiment of the invention, the cabinet-like structure is provided at said second end. Consequently, the rear portion of the animal is close to the cabinet-like structure, since the rear portion of the animal being present in the milking stall is adjacent said second end of the milking stall. Hereby, it may happen that the animal pushes herself against the cabinet-like structure, wherein it is important that the cabinet-like structure may withstand substantially radial forces from the animal but also other forces of course.

According to a further embodiment of the invention, the device comprises means arranged to strengthen the cabinet-like structure in order to withstand substantially radial forces. Said means may comprise a support structural element, which is attached to at least one of said wall members, which surround the inner space of the cabinet-like structure. Moreover, said support structural element may be provided in a plane perpendicular to said substantially vertical direction. Preferably, said support structural element may be provided at the level of the upper rear portion of the animal.

According to a further embodiment of the invention, the cabinet-like structure is arranged to house a driving arrangement provided to remove the milking member from the animal after the milking is finished and said driving arrangement is attached to a support member which comprises means arranged to permit detachment of said support member in said inner space. If the driving arrangement is attached directly to the walls defining said inner space by means of some attachment members, such as screws or the like it may be very difficult to perform service since the inner space is narrow and offers a limited working space. Said means, which makes it possible to detach said support member, onto which the driving arrangement such as a pneumatic power cylinder is attached, facilitates service work and repair. The support member may be detached and may be provided outside the cabinet-like structure during service. An advantage with this arrangement is that service work and repair may be performed in a shorter time compare to if the driving arrangement would have been attached directly to the walls defining said inner space by means of some attachment members. Preferably said means arranged to permit detachment of said support member in said inner space may co-operate with for example an element provided on the outside of the cabinet-like structure by engaging said element. It is to be noted that the cabinet-like structure may house different components, such as said driving arrangement provided to remove the milking member but also other components such as components of the milking equipment for example a pulsator, a control unit comprising a computer arranged to supervise and control the milking procedure and a milking meter.

According to a further embodiment of the invention, the cabinet-like structure comprises an operating panel by which the milking equipment is controllable and the cabinet-like structure comprises a first door portion which is detachably connected to the cabinet-like structure, wherein the operating panel is arranged on said first door portion. By the operating panel it is possible to supervise and control the milking procedure and the milking equipment. Consequently, connections extend from the operating panel to different components of the milking equipment. The operating panel may be of different types and function as a user interface, for example an interface for the milker. The operating panel may be of a simple type and only comprise a switch for the vacuum but it may also comprise a display etc. In case of service or repair of the operating panel it is possible to detach the first door portion and replace it by another one. The first door portion is preferably of a modular construction.

According to a further embodiment of the invention, the first door portion, when connected to the cabinet-like structure, is movable between a first position in which the cabinet-like structure forms a closed structure at least in said substantially vertical direction and a second position in which the inner space of the cabinet-like structure is possible to reach for a person in a working position from the outside of the cabinet-like structure. Hereby, for example the driving arrangement, which may be housed inside the cabinet-like structure, is accessible when said first door portion is in said second position.

According to a further embodiment of the invention, the cabinet-like structure comprises a second door portion which is movable between a first position in which the cabinet-like structure forms a closed structure at least in said substantially vertical direction and a second position, wherein the door portion carries a cleaning device for cleaning the milking member which is possible to use in said second position. Such a cleaning device has means for receiving the teatcups of the milking member after the milking is finished and is connected to a conduit for the supply of cleaning liquid to the teatcups and the claw. By housing the cleaning device inside the cabinet-like structure when it is not in use, it is protected from dirt and dust from the outside environment. This is an advantage since good hygiene is very important when running a dairy farm. By housing the cleaning device inside the cabinet-like structure it is also protected from violence from the animals.

According to a further embodiment of the invention, one of said wall members comprises a continues thin sheet which is shaped in such a way that it surrounds a great part of said inner space. Consequently, said wall member may be produced by essentially one single piece of a sheet. According to one embodiment the sheet is shaped in such a way that it forms, in a cross-sectional view seen along said longitudinal axis, a rear wall portion and two side wall portions. The sheet, which preferably is a metal sheet, may be bent in order to form said rear wall portion and said side wall portions. The rear wall portion may be short in relation to the side wall portions. Moreover, each side wall portion may extend from the rear wall portion so that they form an angel, which is larger than 90° with the rear wall portion. Moreover, each side wall portion may be bent in said vertical direction at a distance from the outer end of each side wall portion in such a way that a plane, which extends along the surface of each of said outer side wall portion is perpendicular to a plane which is parallel to the surface of the rear wall portion. The length of each outer side wall portion, in a cross-sectional view seen along said longitudinal axis, may be shorter than the length of each side wall which extends directly from the rear wall portion, seen in said cross section. Since it may happen that an animal being present in the milking stall may push herself towards said outer side wall portion, it is an advantage that this outer side wall portion is short in order to withstand substantially radial forces from the animal. Moreover, it may happen that an animal being present in the milking stall may kick about. Hereby, it is an advantage that each side wall portion extends from the rear wall portion so that they form an angel, which is larger than 90° with the rear wall portion, since the leg of the animal may run along the surface of the side wall portion. According to one embodiment said support structural element arranged to strengthen the cabinet-like structure is attached to the outer end of said outer side wall portions.

According to a further embodiment of the invention, said wall arrangement forms a side wall of said milking stall and extends between said first end and said second end.

The object is also achieved by the parlour initially defined, wherein each of said milking stalls are defined by at least one wall arrangement and a floor, wherein each milking stall comprises a cabinet-like structure which forms a building element of said parlour.

According to one embodiment of said parlour, said wall arrangement adjoins two milking stalls and the building element carries said wall arrangement and is mounted to the floor of said milking stalls.

According to a further embodiment of the invention, said parlour is a rotary parlour.

BRIEF DESCRIPTION OF THE DRAWINGS

The present invention is now to be explained more closely by means of different embodiments, given as examples, and with reference to the appendant drawings.

FIG. 4a and

FIG. 4b show schematically perspective views of an inner space of the device in FIG. 1.

DETAILED DESCRIPTION OF PREFERRED EMBODIMENTS

Figure 1:
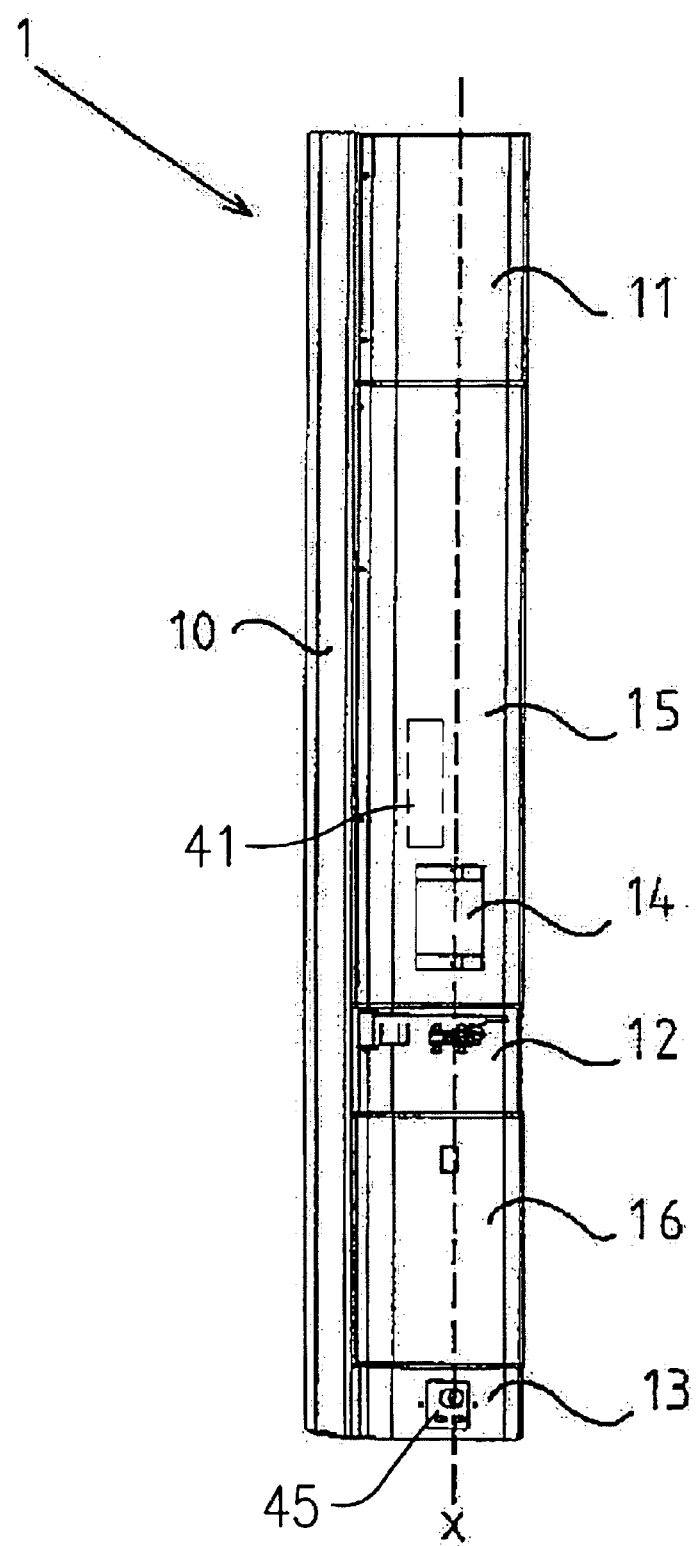
FIG. 1 shows schematically a perspective view of a device according to the present invention.
Figure 2:
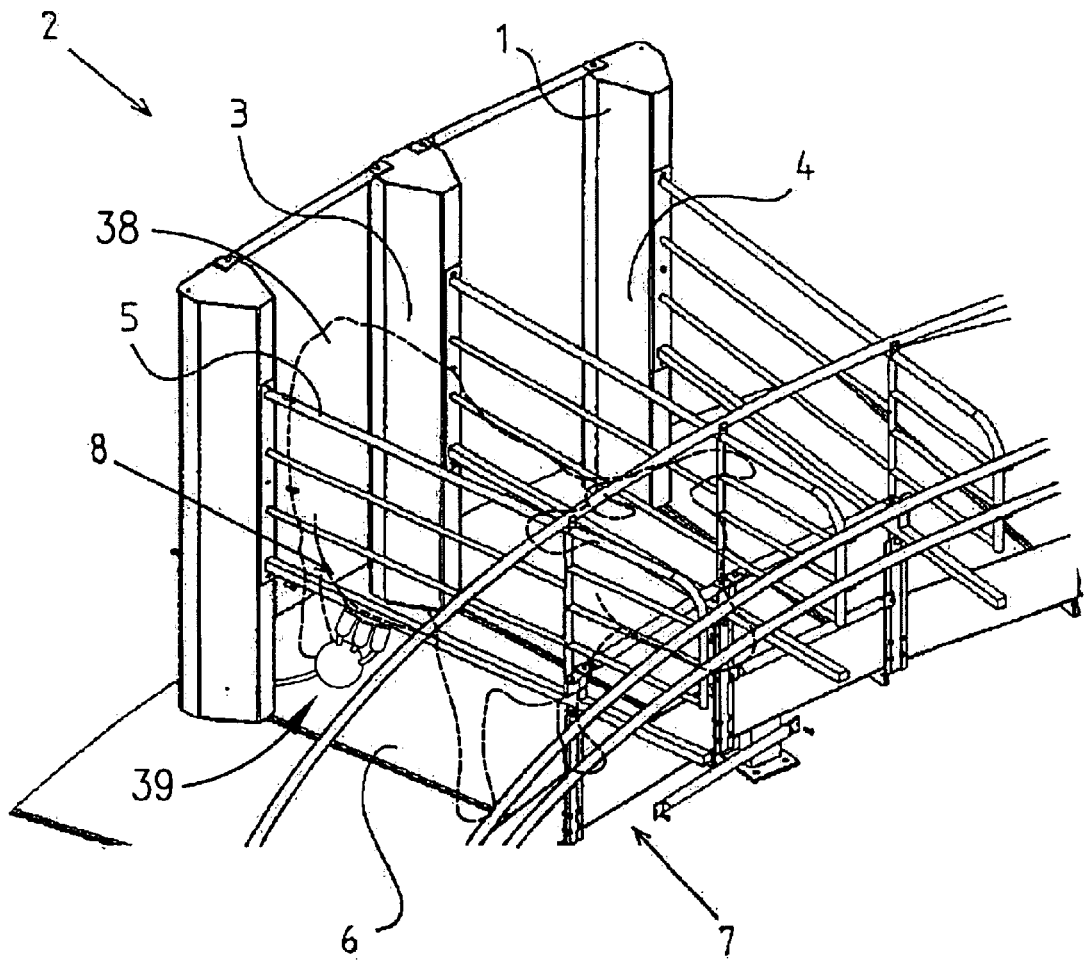
FIG. 2 shows schematically a perspective view of a part of a milking parlour comprising a plurality of milking stalls, wherein the device in FIG. 1 is a part of the milking parlour.
Figure 3:
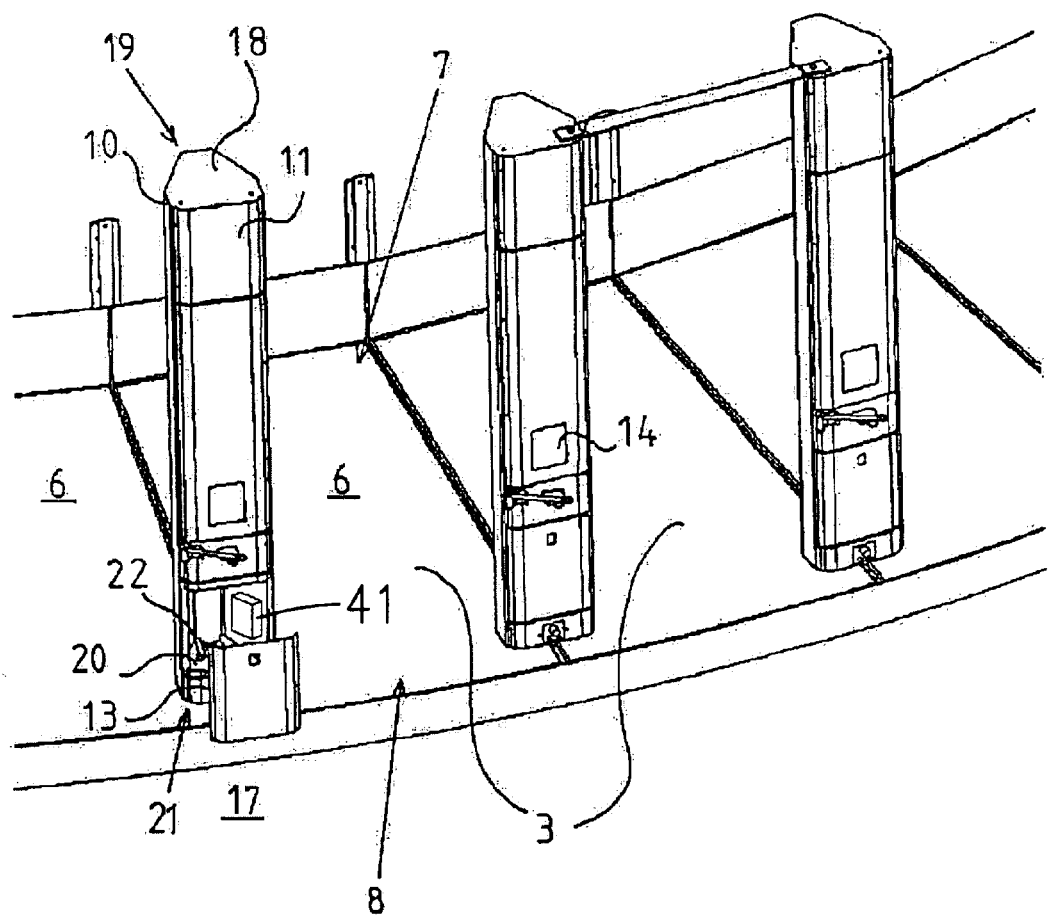
FIG. 3 shows schematically the milking parlour in FIG. 2 from an other perspective view.

The device in FIG. 1 comprises a cabinet-like structure 1 which has a longitudinal axis x extending in a substantially vertical direction and which forms a building element of a milking parlour 2, which is shown in FIG. 2 and FIG. 3.

FIG. 2 shows a part of a rotary milking parlour 2 comprising a plurality of milking stalls 3 each of which is provided with a milking position 4 for an animal. Each milking stall 2 is defined by at least one wall arrangement 5 and a floor 6, and extends between a first end 7 and a second end 8. The wall arrangement 5 forms a side wall of two milking stalls 3 and extends between the first end 7 and the second end 8. Consequently, the wall arrangement 5 adjoins and separates two milking stalls 3 and the cabinet-like structure 1 carries the wall arrangement 5 at the second end 8 and is attached to the floor 6 of each milking stall 3 in question.

The cabinet-like structure 1 defines an inner space 9, shown in FIG. 4a and FIG. 4b, in which components of the milking equipment may be housed. Such as is shown in FIG. 3 the cabinet-like structure 1 comprises wall members 10, 11, 12, 13 which extend in the substantially vertical direction and are connected to each other and form a hollow tube-like structure which surrounds the inner space 9. The wall members 10, 11, 12, 13 are preferably formed of a material with thin wall thickness.

Such as is shown in FIG. 1 the cabinet-like structure comprises an operating panel 14 which is provided on a first door portion 15 of the cabinet-like structure 1. By the operating panel 14 it is possible to supervise and control the milking procedure and the milking equipment 39. Consequently, connections extend from the operating panel 14 to different components of the milking equipment. The first door portion 15 is detachably connected to the cabinet-like structure 1. The first door portion 15 may be pivotably attached to the wall member 10 and may be movable between a first position, shown in FIG. 1, in which the cabinet-like structure 1 forms a closed structure and a second position (not shown) in which the inner space 9 of the cabinet-like structure 1 is possible to reach for a person in a working position from the outside of the cabinet-like structure 1. The cabinet-like structure 1 also comprises a second door portion 16 which is movable between a first position, shown in FIG. 1, in which the cabinet-like structure 1 forms a closed structure and a second position, wherein the second door portion 16 carries a cleaning device for cleaning the milking member 40 which is possible to use in said second position. The second door portion 16 may be pivotably attached to the wall portion 13.

It is to be noted that the person in a working position is standing on the floor 17, cf. FIG. 3, which is separate from the floors 6 of the milking stalls 3. The floors 6 of the milking stalls 3 form a platform, which may rotate during the milking operation of the animals in relation to the floor 17.

As can be seen in FIG. 3 the cabinet-like structure 1 comprises a substantially horizontal top plate 18 provided at a top portion 19 of the cabinet-like structure 1 and a bottom plate 20 provided at a bottom portion 21 of the cabinet-like structure 1. The top plate 18 connects the wall members 10, 11 at the top portion 19 and the bottom plate 20 connects the wall members 10, 13 at the bottom portion 21. Both the top plate 18 and the bottom plate 20 may be formed of a thin metal sheet and the cabinet-like structure 1 may be attached to the floor 6 of each milking stalls 3 in question via the thin bottom plate 20 by means of screws 22. It is to be noted that the separate bottom plate 20 may be excluded, wherein the bottom of the cabinet-like structure may be a part of the floor 6 of each milking stalls 3 in question. It is also to be noted that the wall arrangement 5 is not shown in FIG. 3.

When an animal is present in the milking stall 3, the rear portion of the animal is adjacent the second end 8 and the front portion of the animal is adjacent the first end 7. Since the milking stalls 3 are narrow it may happen that the animal pushes herself against the cabinet-like structure 1.

As can be seen in FIG. 4a and FIG. 4b one of the wall members comprises a continues thin sheet 10 which is shaped in such a way that it surrounds a great part of the inner space 9. Consequently, the wall member 10 is produced by essentially one single piece of a sheet. It is to be noted that wall member 11 is not shown in FIG. 4a and FIG. 4b as well as the first door portion 15 and the second door portion 16. The sheet 10, which preferably is a metal sheet, may be bent in order to form a rear wall portion 23 and two side wall portions 24. The rear wall portion 23 is short in relation to the side wall portions 24. Moreover, each side wall portion 24 extends from the rear wall portion 23 so that they form an angel, which is larger than 90° with the rear wall portion 23. Moreover, each side wall portion 24 is bent in the vertical direction at a distance from the outer end 25 of each side wall portion 24, wherein each side wall portion comprises an outer side wall portion 26. A plane, which extends along the surface of each of the outer side wall portions 26 is perpendicular to a plane which is parallel to the surface of the rear wall portion 23. The length of each outer side wall portion 26, in a cross-sectional view seen along the longitudinal axis x, is shorter than the length of each side wall portion which extends directly from the rear wall portion 23, seen in said cross section. Hereby, an animal being present in the milking stall may be permitted to push herself towards the outer side wall portion 26 of the cabinet like structure 1. Consequently, it is an advantage that this outer side wall portion 26 is short in order to withstand substantially radial forces from the animal.

In order to better withstand such substantially radial forces from an animal the cabinet-like structure 1 may comprise a support structural element 27, which is provided in a plane perpendicular to the substantially vertical direction and which is attached to the wall member 10. Preferably, the support structural element 27 may be provided at a level of the upper rear portion of the animal. The cabinet-like structure may comprise further support structural elements 28, 29.

Figure 5:
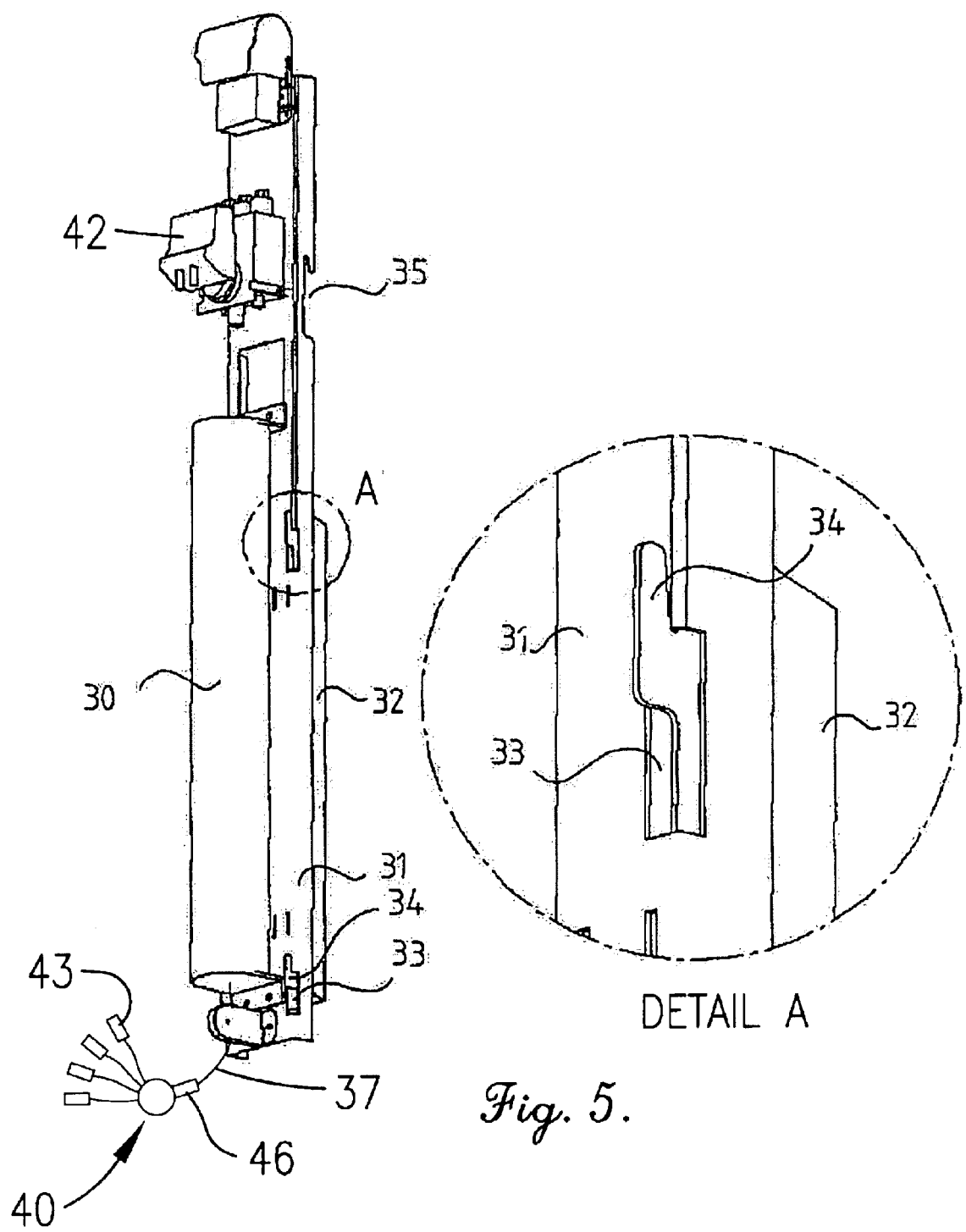
FIG. 5 shows schematically a driving member attached to a support member, which engages a suspension arrangement, which is intended to be attached to the inner space of the device.

FIG. 5 shows a driving arrangement 30 attached to a support member 31, which engages a suspension arrangement 32, which is intended to be attached to the inner space 9 of the cabinet-like structure 1. The suspension arrangement 32 may be arranged to the rear wall portion 23 of the inner space 9 of the cabinet-like structure 1. The driving arrangement 30 comprises a pneumatic power cylinder which through an elongated element 37, such as a cord, is connected to the milking member (not shown) and is provided to remove the milking member from the animal after the milking is finished. By the driving arrangement it is possible to achieve vacuum or compressed air. The driving arrangement 30 is attached to the support member 31, which may be in the form of a rail-which comprises first means 33, which are arranged to co-operate with second means 34 of the suspension arrangement 32 in such a way that the support member 31 with the driving arrangement 30 may be detached from the suspension arrangement 32 which is intended to be provided on the rear wall portion 23 of the inner space 9 of the cabinet-like structure 1. Consequently, the first means are arranged for quick-joint attachment to the second means.

Figure 6:
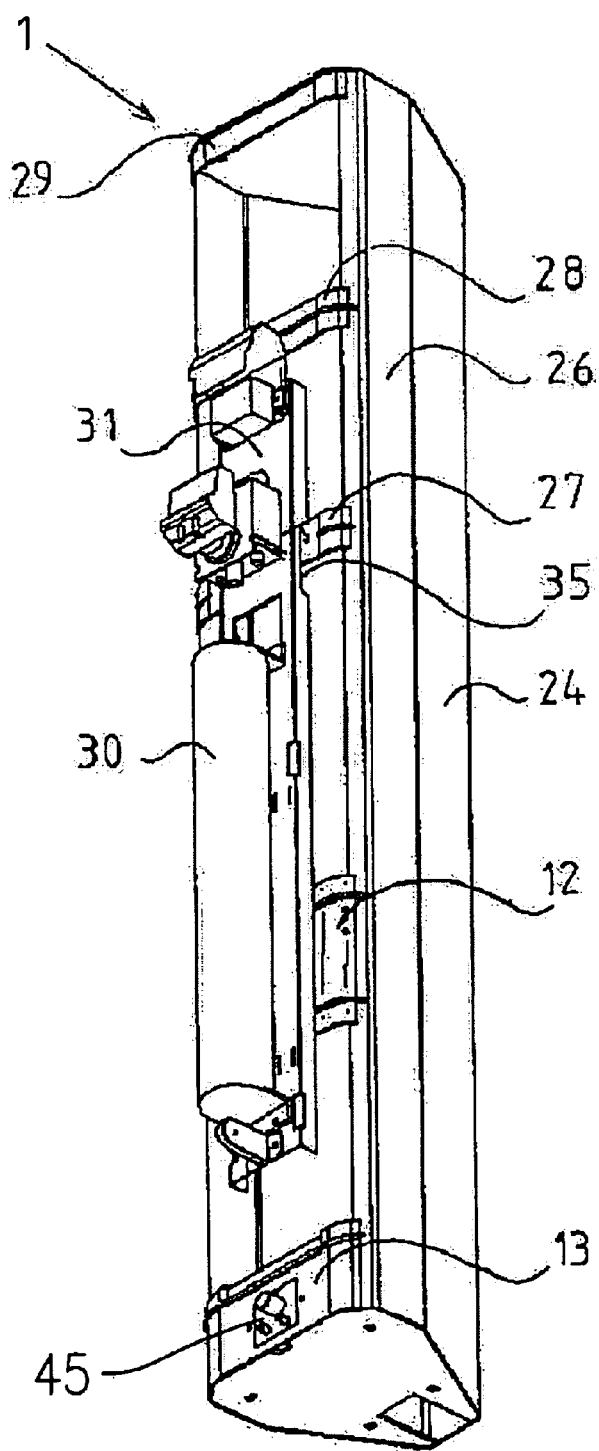
FIG. 6 shows schematically a perspective view of the device with the support member, onto which the driving arrangement is attached and which is provided on the outside of the device.

The first means 33 of the support member 31 may comprise openings and the second means 34 of the suspension arrangement 32 may comprise hooks. Moreover, as can be seen in FIG. 5, the support member 31 may comprise recesses 35, which may be arranged to engage the support structural element 27, which is attached to the wall member 10, as can be seen in FIG. 6. Hereby, when the first door portion 15 is in its second position, it is possible to detach the support member 31 with the driving arrangement 30 from the hooks 34 and to provide the support member 31 with the driving arrangement 30 outside the cabinet-like structure 1 by means of the recesses 35 engaging the support structural element 27. Hereby, service work is facilitated. It is to be noted that the cabinet-like structure 1 may comprise hooks or the like (not shown) provided outside said cabinet-like structure 1 in such a manner that the first means in the form of openings may engage the hooks provided outside the cabinet-like structure 1, wherein a person in a working position standing on the floor 17 may reach the driving arrangement 30 when the first means are engaging the hooks provided outside the cabinet-like structure 1. Moreover, it is to be noted that said first means may comprise recesses similar to the recesses 35 and the second means may comprise a rail or the like which is provided inside said cabinet-like structure 1 in such a way that the said recesses may detachably engage said rail. If the first means comprises recesses, the first means may detachably engage the support structural element 27. It is to be noted that third means in the following claims may comprise said support structural element 27. Further, it is to be noted that wall member 11 is not shown in FIG. 6 as well as the first door portion 15 and the second door portion 16.

It is to be noted that other components of the milking equipment may be attached to the support member 31 in FIG. 5. For example the component may be a computer 41 arranged to control and supervise the milking procedure, for example the vacuum level of the milking equipment, a pulsator 42 which is arranged to provide a pulsating vacuum for a pulsating chamber of each of the teatcups 43 of the milking member 40 a milking meter 44 etc. It is also to be noted that the support member 31 in some cases may be excluded, wherein the component may be associated with the first means in some other way. Moreover, the component associated with said first means may comprise at least one quick-joint connector 45 for operably connecting the component in question to at least one further component of the milking stall 3.

If the component is the driving arrangement 30 such as is shown in FIG. 5, the driving arrangement may comprise at least one quick-joint connector 46 for the elongated member 37 which is connected to the milking member 40. By the quick-joint connector 46 it is possible to quickly detach the elongated member 37. This is an advantage when the driving arrangement 30 is to be replaced. By quickly detaching the elongated member from the driving arrangement 30, the driving arrangement 30 together with the support member 31 may be replaced by a new driving arrangement attached to an other, similar support member. The new driving arrangement may also comprise at least one quick-joint connector for operably connecting the new driving arrangement with the elongated member. It is to be noted that the driving arrangement 30 may comprise several quick-joint connectors, preferably one quick-joint connector for each component to which the driving arrangement 30 is connected.

The present invention is not restricted to the embodiments shown above but may be varied and modified within the scope of the following claims.

What is claimed is:

1. A device for at least one milking stall with a milking position for an animal and with at least one milking equipment, the milking equipment comprising a milking member arranged to be attached to the animal for milking thereof, wherein the milking stall is defined by at least one wall arrangement and a floor, and extends between a first end and a second end in such a way that when an animal is present in the milking stall in the milking position, the front portion of the animal is adjacent the first end and the back portion of the animal is adjacent the second end, wherein the device comprises a cabinet-like structure which has a longitudinal axis extending in a substantially vertical direction and which defines an inner space, wherein the cabinet-like structure forms a building element of the milking stall, and wherein the building element carries the wall element.

2. A device according to claim 1, wherein the building element is mounted to the floor.

3. A device according to claim 1, wherein the cabinet-like structure comprises wall members of a material with thin wall thickness and that the wall members extend in said substantially vertical direction and are attached to each other and form a hollow tube-like structure which surrounds said inner space.

4. A device according to claim 3, wherein the cabinet-like structure comprises a top portion, a bottom portion which is attached to the floor, a substantially horizontal top plate which connects at least some of the wall members at the top portion, and a substantially horizontal bottom plate which connects at least some of the wall members at the bottom portion, wherein the cabinet-like structure forms an elongated hollow box-like structure which extends in said substantially vertical direction and which encloses said inner space.

5. A device according to claim 4, wherein the bottom plate is a part of the floor.

6. A device according to claim 4, wherein the bottom plate is formed of a thin metal sheet and that the cabinet-like structure is attached to the floor via said thin metal sheet.

7. A device according to claim 1, wherein the cabinet-like structure is provided at said second end.

8. A device according to claim 3, wherein at least one of the wall members is formed of a thin metal sheet.

9. A device according to claim 6, wherein the thickness of the metal sheet is about 2–4 mm.

10. A device according to claim 4, wherein the top plate is formed of a thin metal sheet.

11. A device according to claim 3, wherein the device comprises means arranged to strengthen the cabinet-like structure in order to withstand radial forces and wherein said means comprises a support structural element which is attached to at least one of said wall members.

12. A device according to claim 11, wherein said structural support element is provided in a plane perpendicular to said substantially vertical direction.

13. A device according to claim 11 wherein one of said wall members comprises a continuous thin sheet which is shaped in such a way that it surrounds a great part of said inner space and forms, in a cross-sectional view seen along said longitudinal axis, a rear wall portion and two side wall portions, and wherein said support structural element is attached to said side wall portions.

14. A device according to claim 3, wherein one of said wall members comprises a continuous thin sheet which is shaped in such a way that it surrounds a great part of said inner space.

15. A device according to claim 14, wherein said continuous thin sheet forms at least, in a cross-sectional view seen along said longitudinal axis, a rear wall portion and two side wall portions.

16. A device according to claim 1, wherein the device comprises means arranged to strengthen the cabinet-like structure in order to withstand radial forces.

17. A device according to claim 1, wherein said wall arrangement forms a side wall of a milking stall and extends between said first end and said second end.

18. A device for at least one milking stall with a milking position for an animal and with at least one milking equipment, the milking equipment comprising a milking member arranged to be attached to the animal for milking thereof, wherein the milking stall is defined by at least one wall arrangement and a floor, and extends between a first end and a second end in such a way that when an animal is present in the milking stall in the milking position, the front portion of the animal is adjacent the first end and the back portion of the animal is adjacent the second end, wherein the device comprises a cabinet-like structure which has a longitudinal axis extending in a substantially vertical direction and which defines an inner space, wherein the cabinet-like structure forms a building element of the milking stall, and wherein the cabinet-like structure comprises a top portion and a bottom portion and that said bottom portion is attached to the floor.

19. A device for at least one milking stall with a milking position for an animal and with at least one milking equipment, the milking equipment comprising a milking member arranged to be attached to the animal for milking thereof, wherein the milking stall is defined by at least one wall arrangement and a floor, and extends between a first end and a second end in such a way that when an animal is present in the milking stall in the milking position, the front portion of the animal is adjacent the first end and the back portion of the animal is adjacent the second end, wherein the device comprises a cabinet-like structure which has a longitudinal axis extending in a substantially vertical direction and which defines an inner space, wherein the cabinet-like structure forms a building element of the milking stall, and wherein the cabinet-like structure is arranged to house a driving arrangement provided to remove the milking member from the animal after the milking is finished and that said driving arrangement is attached to a support member which comprises first means arranged to permit detachment of said support member in said inner space.

20. A device for at least one milking stall with a milking position for an animal and with at least one milking equipment, the milking equipment comprising a milking member arranged to be attached to the animal for milking thereof, wherein the milking stall is defined by at least one wall arrangement and a floor, and extends between a first end and a second end in such a way that when an animal as present in the milking stall in the milking position, the front portion of the animal is adjacent the first end and the back portion of the animal is adjacent the second end, wherein the device comprises a cabinet-like structure which has a longitudinal axis extending in a substantially vertical direction and which defines an inner space, wherein the cabinet-like structure forms a building element of the milking stall, and wherein the device comprises an operating panel by which the milking equipment is controllable and that the device comprises a first door portion which is detachably connected to the cabinet-like structure, wherein the operating panel is arranged on said first door portion.

21. A device according to claim 20, wherein the first door portion, when connected to the cabinet-like structure, is movable between a first position, in which the cabinet-like structure forms a closed structure at least in said substantially vertical direction, and a second position, in which the inner space of the cabinet-like structure is possible to reach for a person in a working position from outside of the cabinet-like structure.

22. A device for at least one milking stall with a milking position for an animal and with at least one milking equipment, the milking equipment comprising a milking member arranged to be attached to the animal for milking thereof, wherein the milking stall is defined by at least one wall arrangement and a floor, and extends between a first end and a second end in such a way that when an animal is present in the milking stall in the milking position, the front portion of the animal is adjacent the first end and the back portion of the animal is adjacent the second end, wherein the device comprises a cabinet-like structure which has a longitudinal axis extending in a substantially vertical direction and which defines an inner space, wherein the cabinet-like structure forms a building element of the milking stall, and wherein the device comprises a door portion which is connected to the cabinet-like structure and is movable between a first position, in which the cabinet-like structure forms a closed structure at least in said substantially vertical direction, and a second position, wherein the door portion carries a cleaning device for cleaning the milking member which is possible to use when the door portion is in said second position.

23. A device for at least one milking stall with a milking position for an animal and with at least one milking equipment, the milking equipment comprising a milking member arranged to be attached to the animal for milking thereof, wherein the milking stall is defined by at least one wall arrangement and a floor, and extends between a first end and a second end in such a way that when an animal is present in the milking stall in the milking position, the front portion of the animal is adjacent the first end and the back portion of the animal is adjacent the second end, wherein the device comprises a cabinet-like structure which has a longitudinal axis extending in a substantially vertical direction and which defines an inner space, wherein the cabinet-like structure forms a building element of the milking stall, and including an arrangement which comprises first means for quick-joint attachment to at least second means arranged inside said inner space in such a manner that the first means detachably engage said second means, wherein at least one component is associated with said first means.

24. A device according to claim 23, wherein said component is provided completely inside said inner space when said first means engage said second means.

25. A parlour according to claim 23, wherein said component is selected from a group of components consisting of a driving arrangement, a pulsator, a milk meter, a computer, and combinations thereof.

26. A parlour comprising a plurality of milking stalls, each of which is provided with a milking position for an animal and with at least one milking equipment comprising a milking member arranged to be attached to the animal being present in the milking stall in question for milking thereof, wherein each of said milking stalls are defined by at least one wall arrangement and a floor and extends between a first end and a second end in such a way that when an animal is present in one of said milking stalls in said milking position, the front portion of said animal is adjacent said first end and the back portion of said animal is adjacent said second end, wherein each milking stall comprises a cabinet-like structure, which has a longitudinal axis extending in a substantially vertical direction and which defines an inner space, and wherein the cabinet-like structure forms a building element of said parlour and the building element carries said wall arrangement.

27. A parlour according to claim 26, wherein said wall arrangement adjoins two milking stalls and that the building element is mounted to the floor of said milking stalls.

28. A parlour comprising a plurality of milking stalls, each of which is provided with a milking position for an animal and with at least one milking equipment comprising a milking member arranged to be attached to the animal being present in the milking stall in question for milking thereof, wherein each of said milking stalls are defined by at least one wall arrangement and a floor and extends between a first end and a second end in such a way that when an animal is present in one of said milking stalls in said milking position, the front portion of said animal is adjacent said first end and the back portion of said animal is adjacent said second end, wherein each milking stall comprises a cabinet-like structure, which has a longitudinal axis extending in a substantially vertical direction and which defines an inner space, and wherein the cabinet-like structure forms a building element of said parlour, and wherein said parlour is a rotary parlour.

29. A device for at least one milking stall with a milking position for an animal and with at least one milking equipment comprising a milking member arranged to be attached to the animal for milking thereof, wherein the milking stall is defined by at least one wall arrangement and a floor, and extends between a first end and a second end in such a way that when the animal is present in the milking stall in the milking position, the front portion of the animal is adjacent the first end and the back portion of the animal is adjacent the second end, said device comprising a cabinet-like structure which has a longitudinal axis extending in a substantially vertical direction and which defines an inner space and including an arrangement which comprises first means for quick-joint attachment to at least second means arranged inside said inner space in such a manner that the first means detachably engage said second means, wherein at least one component is associated with said first means.

30. A device according to claim 29, wherein said component is provided completely inside said inner space when said first means engage said second means.

31. A device according to claim 29, wherein said attachment comprises at least third means for quick-joint attachment to at least said first means in such a manner that the first means detachably engages the third means, wherein the third means is provided on the cabinet-like structure so that said component is easy to reach for a person in a working position from the outside of the cabinet-like structure when said first means engage said third means.

32. A device according to claim 29, wherein said component associated with said first means comprises at least one quick-joint connector for operably connecting said component to at least one further component the milking stall.

33. A device according to claim 29, wherein said component is selected from a group of components consisting of a driving arrangement, a pulsator, a milk meters a computer, and combinations thereof.

* * * * *